United States Patent
Jakobsmeyer

(10) Patent No.: US 10,399,479 B2
(45) Date of Patent: Sep. 3, 2019

(54) HEADLIGHT FOR A MOTOR VEHICLE

(71) Applicant: HELLA GmbH & Co. KGaA, Lippstadt (DE)

(72) Inventor: Helmut Jakobsmeyer, Paderborn (DE)

(73) Assignee: Hella GmbH & Co. KGAA, Lippstadt (DE)

( * ) Notice: Subject to any disclaimer, the term of this patent is extended or adjusted under 35 U.S.C. 154(b) by 46 days.

(21) Appl. No.: 15/860,022

(22) Filed: Jan. 2, 2018

(65) Prior Publication Data

US 2018/0118092 A1    May 3, 2018

Related U.S. Application Data

(63) Continuation of application No. PCT/EP2016/062545, filed on Jun. 2, 2016.

(30) Foreign Application Priority Data

Jul. 1, 2015 (DE) .................. 10 2015 110 553

(51) Int. Cl.
*B60Q 1/068* (2006.01)
*B60Q 1/076* (2006.01)
*F21S 41/657* (2018.01)

(52) U.S. Cl.
CPC ............ *B60Q 1/068* (2013.01); *B60Q 1/076* (2013.01); *F21S 41/657* (2018.01); *B60Q 2200/32* (2013.01); *B60Q 2200/36* (2013.01)

(58) Field of Classification Search
CPC .... B60Q 1/068; B60Q 1/076; B60Q 2200/32; B60Q 2200/36; F21S 41/657
See application file for complete search history.

(56) References Cited

U.S. PATENT DOCUMENTS

| | | | |
|---|---|---|---|
| 2003/0117812 A1* | 6/2003 | Serizawa | B60Q 1/0683 362/528 |
| 2008/0198617 A1* | 8/2008 | Schwab | B60Q 1/076 362/545 |
| 2014/0003080 A1* | 1/2014 | King | B60Q 1/0683 362/525 |

(Continued)

FOREIGN PATENT DOCUMENTS

| | | |
|---|---|---|
| AT | 513440 A1 | 4/2014 |
| DE | 10 2009 033 910 A1 | 1/2011 |

(Continued)

*Primary Examiner* — Alan B Cariaso
(74) *Attorney, Agent, or Firm* — Muncy, Geissler, Olds & Lowe, P.C.

(57) ABSTRACT

A headlight for a motor vehicle having a first light module, which is received in a first support frame, and at least one second light module, which is received in a second support frame. A headlight range adjustment device has an adjustment element, which extends between the headlight range adjustment device and the first support frame in an adjustment axis. The adjustment element has a ball head, which is accommodated by a ball head receptacle on the first support frame. A joint piece with a ball socket is arranged on the first support frame, wherein in the ball socket, a ball head of a coupling element is received. An arrangement of the joint piece is formed on a first support frame, and the adjustment axis of the adjustment element runs in its extension through the ball head of the coupling element.

9 Claims, 4 Drawing Sheets

(56) References Cited

U.S. PATENT DOCUMENTS

2015/0117042 A1* 4/2015 Burton ................ B60Q 1/0683
362/487
2015/0252995 A1 9/2015 Jestel et al.

FOREIGN PATENT DOCUMENTS

| DE | 10 2014 102 867 A1 | 9/2015 |
|----|---|---|
| EP | 2 719 579 A2 | 4/2014 |
| EP | 2 803 528 A1 | 11/2014 |
| EP | 2 881 283 A1 | 6/2015 |
| FR | 2 424 157 | 11/1979 |

* cited by examiner

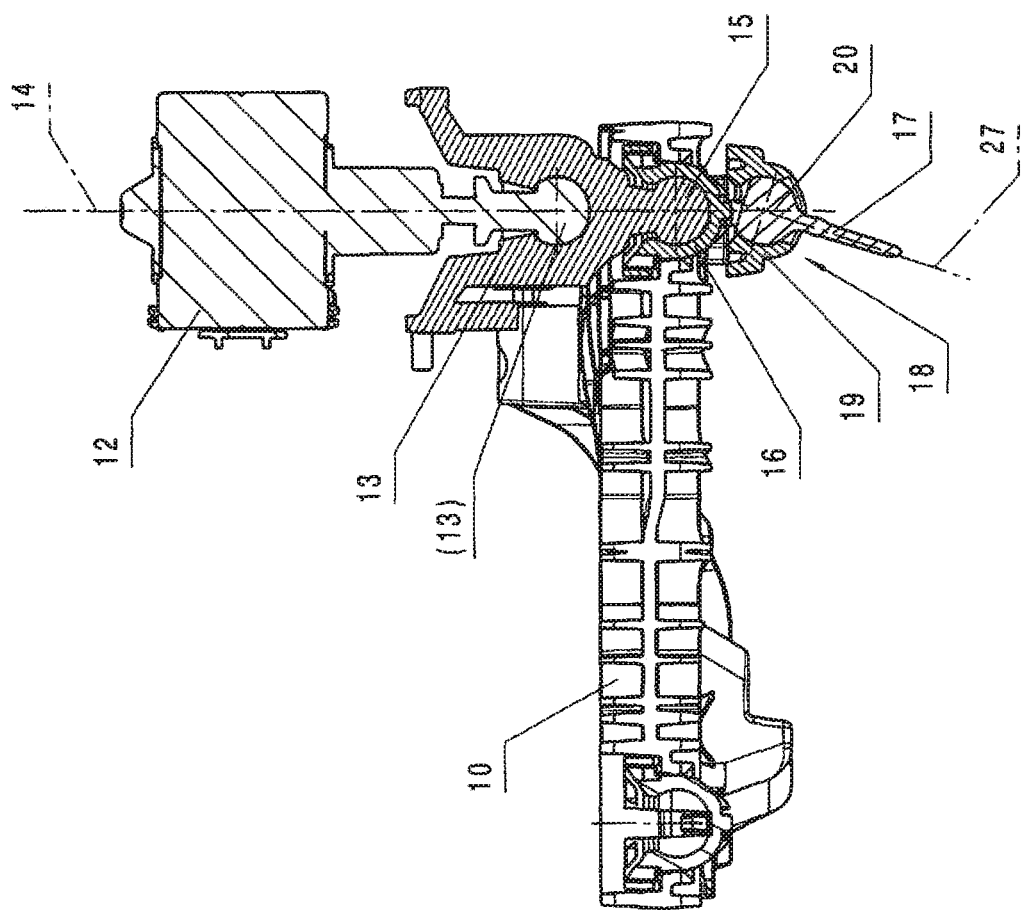

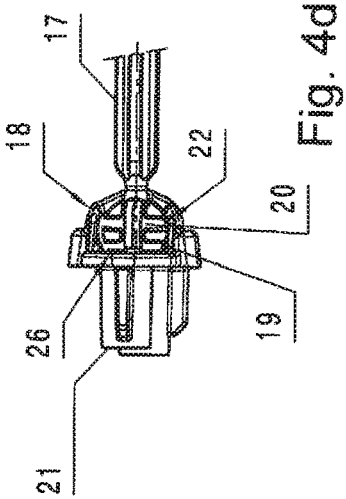
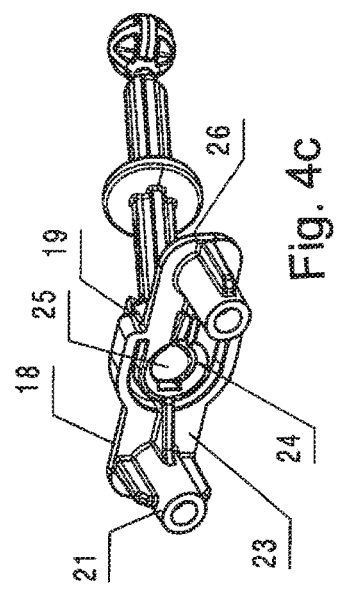
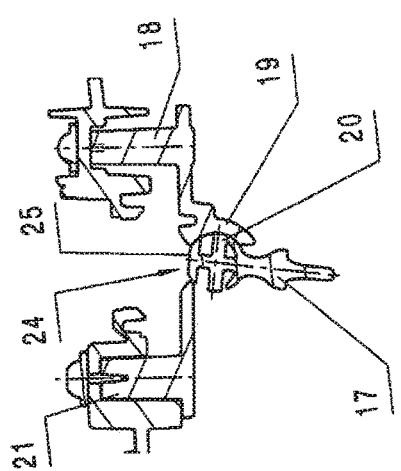
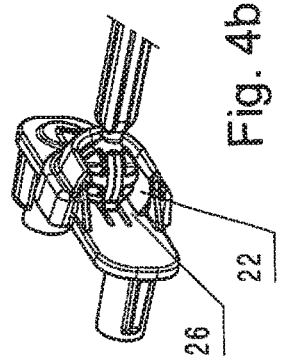

HEADLIGHT FOR A MOTOR VEHICLE

This nonprovisional application is a continuation of International Application No. PCT/EP2016/062545, which was filed on Jun. 2, 2016, and which claims priority to German Patent Application No. 10 2015 110 553.5, which was filed in Germany on Jul. 1, 2015, and which are both herein incorporated by reference.

BACKGROUND OF THE INVENTION

Field of the Invention

The present invention relates to a headlight for a motor vehicle having a first light module, which is received in a first support frame, and having at least a second light module, which is received in a second support frame, wherein a headlight range adjustment device is provided with an adjustment element, which extends between the headlight range adjustment device and the first support frame along an adjustment axis, and wherein the adjustment element has a ball head, which is accommodated by means of a ball head receptacle on the first support frame, and wherein a coupling element is provided, with which the first support frame is connected to the second support frame.

Description of the Background Art

From FR 2 424 157 A1, a generic headlight for a motor vehicle is known. The headlight has a housing in which two light modules are received, which are partially indicated by reflectors.

The light modules are housed in the respective support frame, and the support frames can be tilted in the housing of the headlight to change the beam range of the light that can be emitted by the light modules. In this case, the light modules may involve a low beam module and a high beam module, wherein headlights are also known with which light fields are generated in front of a vehicle, which are composed of light from different light modules. If the beam range of the light modules is adjusted, it can lead to shifts of the individual partial light fields, which are undesirable.

DE 10 2014 102 867 A1, which corresponds to US 2015/0252995, which is incorporated herein by reference, discloses a headlight for a motor vehicle having a first light module, which is received in a first support frame, and having at least one second light module, which is received in a second support frame, and both support frames can be changed in their position in the housing of the headlight with a headlight range adjustment device. The two support frames are connected to a coupling element, and the adjustment element between the headlight range adjustment device and the first support frame is mounted on a pivot on the first support frame, in which the coupling element is also mounted for coupling the second support frame. Thus, both pivot points coincide, preventing any unwanted shifts of partial light fields when the support frames are changed in their position in the headlight.

In the conventional prior art, however and disadvantageously, difficulties arise in the assembly of the complex and multi-part coupling point between the adjustment element and the coupling element; in particular, inspection of a properly mounted arrangement is possible only with increased effort and appropriate experience of the assembler.

When looking at the various pivot points on the first support frame for connecting the adjustment element and for connecting the coupling element, in a point-by-point configuration there is the disadvantage of a deviation of the two support frames during adjustment, which results in the axial offset of composite light fields. In a point-in-point configuration, assembly disadvantages arise, which must also be overcome.

SUMMARY OF THE INVENTION

It is therefore an object of the present invention to provide a headlight for a motor vehicle having an improved coupling of at least two support frames, wherein the support frames should be jointly adjustable by means of a headlight range adjustment device, and wherein a mutual deviation of light fields during adjustment should be avoided. Furthermore, it is desirable to provide an easy assembly of the arrangement, which in particular allows for simple quality control and can also be performed by an assembler with less installation experience.

In an exemplary embodiment, a joint piece is provided with a ball socket and arranged on the first support frame, wherein in the ball socket, a ball head of the coupling element is received and wherein the arrangement of the joint piece is formed such on the first support frame, that the adjustment axis of the adjustment element runs in its extension through the ball head of the coupling element.

The inventive construction of the articulated connection of the coupling element with the first support frame by means of a joint piece allows for a particularly advantageous arrangement of the ball head of the coupling element in relation to the ball head of the adjustment element. The joint piece is inventively designed in the same way, so that the adjustment axis of the adjustment element runs in its extension through the ball head of the coupling element. The separate formation of the joint piece results in a simple installation, which can be easily inspected, in particular with regard to the quality of assembly. In particular, however, there is the benefit that when adjusting the first support frame by means of the headlight range adjustment device, a concurrent adjustment of the second support frame does not lead to a deviation of the light fields of the light modules, since the coaxial alignment of the two ball heads, i.e., a ball-in front of-ball arrangement, forms the same nearly ideal arrangement as a ball-in-ball arrangement according to the prior art. However, the connections of the adjustment element and the coupling element to the first support frame are decoupled from each other, since the connection no longer takes place in a common connection point. However, as long as the ball head of the coupling element is in extension of the adjustment axis of the adjustment element, both support frames can be tilted synchronously towards each other, resulting for each tilt position of the support frames in an ideal composition of partial light fields, which are provided by the respective light modules in the support frames.

The joint piece can be attached to the side facing away from the headlight range adjustment device on the first support frame, for which purpose the joint piece has a fastening portion. The attachment to the first support frame can also be understood as an attachment that occurs in the first support frame. The attachment with the fastening portion may be performed by a connector, by a cohesive and/or a positive or form-locking connection, and in particular, the joint piece may also have two or more fastening portions. Advantageously, the joint piece is rigidly disposed on the first support frame.

According to an embodiment of the inventive joint piece, the ball socket of the joint piece can have a lateral opening through which the ball head of the coupling element can be inserted into the ball socket when the joint piece is arranged on the first support frame. An assembler can easily connect the coupling element to the joint piece, and the side opening is designed such that the assembler can thread the ball head into the side opening under visual control. Thus, locking of the coupling element can be achieved on the joint piece, which prevents unwanted separation of the coupling element from the joint piece.

The joint piece can be designed in a particularly simple manner, in particular as a plastic injection-molded component, and is formed integrally with the ball socket and with the fastening portion. In particular, as a result of the overall arrangement, no further components with the joint piece are required, since in a ball-in-ball variant, a joint sleeve would be required, which must provide a coupling of the adjustment element with the coupling element with simultaneous insertion in the first support frame, and which is omitted here.

For example, the fastening portion can be designed as a fastening dome, into which a screw element can be inserted. The screw element can be screwed in particular into the first support frame, and a through hole is located in the fastening dome. If the joint piece has two fastening portions, these can, for example, also both be designed as fastening domes, and it is also conceivable that a first fastening dome serves for the positive connection to the support frame, for example, by a form-closing hook, and a further fastening dome serves to receive a fastening element, in particular a screw element.

According to an embodiment of the joint piece, the latter has a basic structure portion which integrally connects the fastening portion with the ball socket, wherein the fastening section projects perpendicularly from the basic structure portion and wherein the lateral opening of the ball socket is located at one end side of the fastening section. In particular, the joint piece can be designed in such a way that the basic structure portion extends between the ball socket and the fastening portion. In particular, the ball socket can sit on one end side of the fastening portion.

The ball socket of the joint piece can have a bottom-side opening, to which or in which the ball head receptacle for accommodating the one ball head on the adjustment element projects or is seated. Thereby, the distance between the two ball heads of the adjustment element and the coupling element is further reduced, resulting in an even smaller offset error of the movements of the support frames when these are adjusted by the headlight range adjustment device. The bottom-side opening creates a space for arranging the ball head receptacle, wherein the opening in the ball socket of the joint piece does not affect the joint function with the ball head of the coupling element.

According to an embodiment of the inventive connection of the second support frame to the first support frame, the ball head of the coupling element can have a planar surface, which can be brought into overlap with a planar bottom portion in the ball socket, for insertion of the ball head in the ball socket. The planar bottom portion can form the portion of the ball socket in which the bottom-side opening is attached. If, for example, the ball head is inserted laterally into the opening, perpendicular to the plane of extent of the basic structure portion of the joint piece, then the planar surface of the ball head can lie flush against the bottom portion of the ball socket. By means of the bottom-side opening, a movement space of the ball head is provided in the final arrangement, wherein the point of rotation of the ball head in the ball socket is located centrally above the, for example, round bottom-side opening. Thus, if the ball head is rotated in the inserted state in the ball socket, so that the coupling axis of the coupling element is offset from the adjustment axis of the adjustment element, then part of the ball head enters into the bottom-side opening, resulting in a positive connection of the ball head in the ball socket so that the latter quasi locks in the joint piece. Consequently, subject to an angular displacement of the coupling element in the ball socket, the coupling element can no longer exit from said socket so that the coupling element is firmly connected to the joint piece. Only in an orthogonal, i.e., vertical extension direction of the coupling axis over the planar surface of the planar bottom portion in the ball socket can the ball head be again released therefrom. In the installed state, however, the coupling element has, for example, a coupling axis which extends at an angle relative to the adjustment axis. Consequently, the arrangement of the coupling element is secured in the joint piece for each movement situation of the support frame in the headlight.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3 is a cross-sectional view through the connection of the adjustment element with the support frame, and the coupling element with the support frame, FIGS. 4*a*-4*d* are partial views showing a sectional view of the arrangement of the ball head of the coupling element in the ball socket of the joint piece, a first perspective view of the joint piece with the coupling element, a second perspective view of the joint piece and coupling element, and a perspective view of the joint piece and coupling element, respectively.

DETAILED DESCRIPTION

Figure 1:
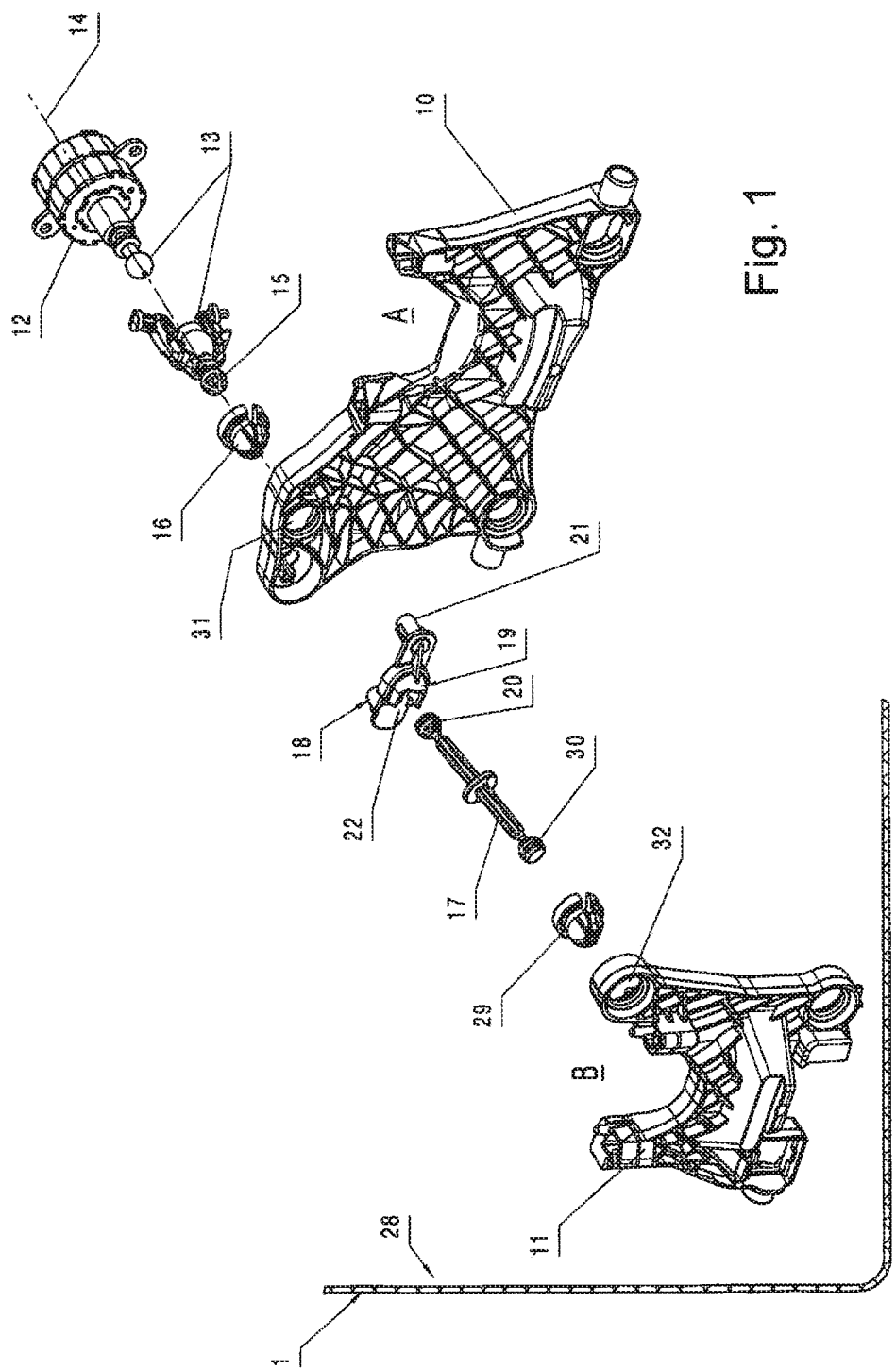
FIG. 1 shows a view of the headlight with the features of the invention in an exploded view.
Figure 2:
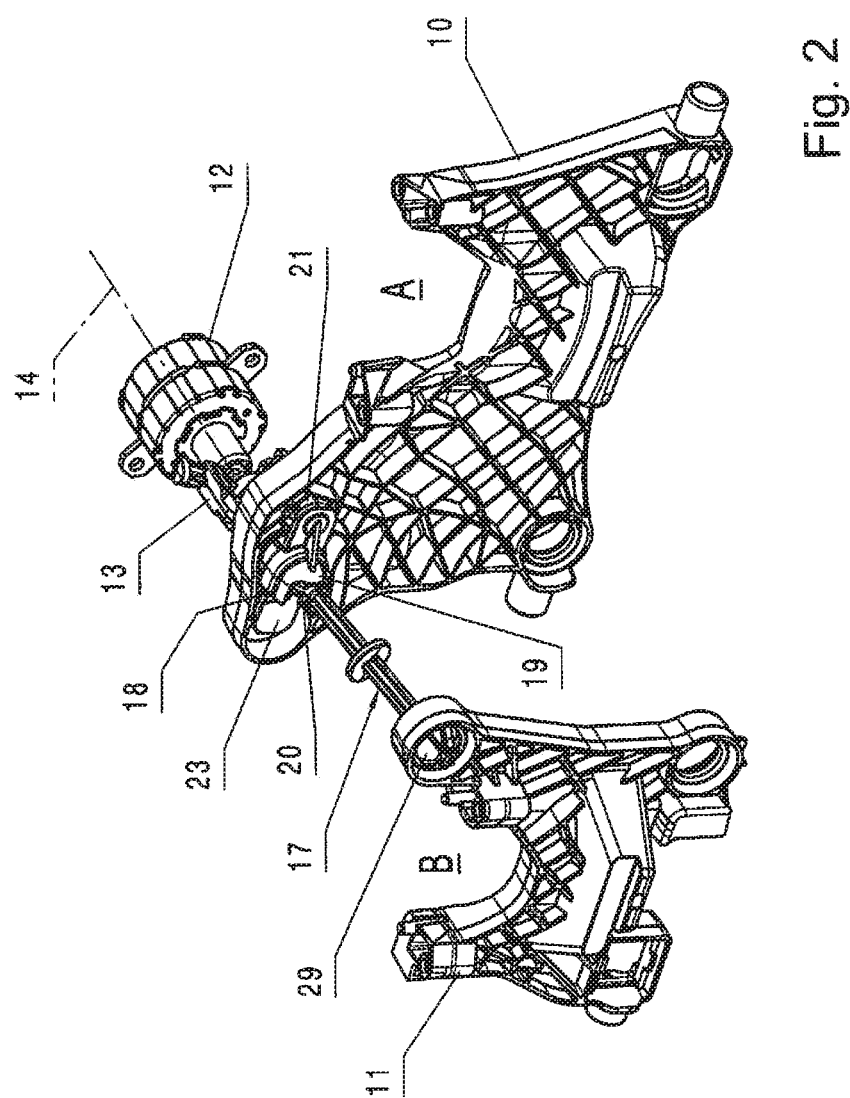
FIG. 2 is a perspective view of support frames assembled together and the headlight range adjustment device with the adjustment element and with the coupling element between the two support frames.

FIGS. 1 and 2 show the support frames 10 and 11 for receiving the light modules, which are shown in their position as A and B, in an exploded view (FIG. 1), and in an assembled view (FIG. 2). By way of example, FIG. 1 also shows a part of a headlight 1, which is indicated by a headlight housing 28.

To adjust the support frames 10 and 11, a headlight range adjustment device 12 is provided, which is arranged on a first, perspective-view rear side of the first support frame 10. The headlight range adjustment device 12 can be operated electrically or mechanically and is used for permanent tracking of the support frames 10 and 11 during the driving operation of the vehicle or preferably for a one-time, for example, pre-assembly adjustment of the support frames 10 and 11.

The connection of the headlight range adjustment device 12 with the first support frame 10 takes place by means of an adjustment element 13, which is placed on the movement end of the headlight range adjustment device 12. At the end of the adjustment element 13 is a ball head 15 which is accommodated by means of a ball head receptacle 16 on the first support frame 10. If the ball head 15 is inserted into the ball head receptacle 16, then the ball head receptacle 16 can be inserted into a receiving opening 31 which is incorporated in the first support frame 10. In this case, the ball head receptacle 16 can be clamped in the receiving opening 31 in such a way that the ball head 15 can no longer disengage from the ball head receptacle 16.

The second support frame 11 is connected to the first support frame 10 by means of a coupling element 17, and the coupling element 17 has ball heads 20 and 30 on both end sides. To connect the coupling element 17 to the second support frame 11, another ball head receptacle 29 is used, which is inserted into the receiving opening 32 that is incorporated in the second support frame 11.

According to an embodiment of the invention, the connection of the coupling element 17 to the first support frame 10 comprises a joint piece 18 with a ball socket 19, so that the coupling element 17 is arranged with the joint piece 18 on the first support frame 10. The joint piece 18 is rigidly attached to the support frame 10. In the ball socket 19 of the joint piece 18, the ball head 20 of the coupling element 17 can be received, wherein the ball head 20 is inserted through a lateral opening 22 into the ball socket 19. For attachment of the joint piece 18 on the first support frame 10, the former has a fastening portion 21.

The arrangement of the joint piece 18 on the first support frame 10 is formed such that the adjustment axis 14, which extends through the adjustment element 13, runs in its extension through the ball head 20 of the coupling element 17. If the first support frame 10 is adjusted by means of the headlight range adjustment device 12, and also the second support frame 11 by means of the coupling with the coupling element 17, partial light fields generated by the light modules A and B can maintain an unchanged position relative to one another, regardless of the tilted position of the support frames 10 and 11. This advantageous embodiment results from the arrangement of the ball head 20 on the coupling element 17 in extension of the adjustment axis 14, which is defined by the longitudinal extension of the adjustment element 13. In particular, the adjustment axis 14 is defined by the ball heads on the headlight range adjustment device 12, shown as part of the adjustment element 13, and by the ball head 15 on the adjustment element 13. Here, the adjustment axis 14 extends through both centers of rotation of the ball heads.

In a cross-sectional view, FIG. 3 shows the headlight range adjustment device 12, which is coupled to the first support frame 10 by means of the adjustment element 13. The ball head 15 of the adjustment element 13 is accommodated in the ball head receptacle 16, which is seated in the first support frame 10. Also shown is the joint piece 18 with the ball socket 19 and the ball head 20 of the coupling element 17, which is seated in the ball socket 19.

The extension of the adjustment axis 14 extends through the ball head 20, which is located in its arrangement on the joint piece 18 immediately behind the ball head 15. The coupling element 17 has a longitudinal extent in a coupling axis 27, which extends at an angle to the adjustment axis 14, thereby preventing the ball head 20 from being automatically released from the ball socket 19 so that the ball head 20 is quasi locked in the ball socket 19.

In various perspective views, FIGS. 4a, 4b, 4c and 4d show the joint piece 18 with the coupling element 17, wherein the ball head 20 of the coupling element 17 is located in the ball socket 19 of the joint piece 18. The joint piece 18 is further shown with the fastening portion 21, and a basic structure portion 23 extends between the fastening portion 21 and the ball socket 19. The fastening portion 21 is designed as a fastening dome and projects perpendicularly from the basic structure portion 23.

The perspective views show the ball socket 19 of the joint piece 18 with a lateral opening 22, through which the ball head 20 can be inserted into the ball socket 19 in a specific position.

With cross sectional views, FIGS. 4a and 4b show a planar surface 25 on the underside of the ball head 20, opposite to the direction of extension of the coupling element 17. Furthermore, the ball socket 19 has a planar bottom portion 26, and when the ball head 20 is inserted through the opening 22 into the ball socket 19, the planar surface 25 on the ball head 20 rests flat on the planar bottom portion 26. By a subsequent, for example, slight tilting of the coupling element 17, the ball head 20 rotates in the ball socket 19, and through a bottom-side opening 24 incorporated in the region of the planar bottom portion 26, a positive connection results between the edge of the bottom opening 24 and the edge of the planar surface 25. Consequently, the ball head 20 can no longer disengage from the ball socket 19.

Due to the special design of the joint piece 18 in connection with the ball head 20, the coupling element 17 can be easily inserted into the ball socket 19 of the joint piece and already with a slight rotation of the coupling element 17, a positive connection is formed, so that the coupling element 17 is prevented from being released from the first support frame 10. In particular, the coupling element 17 can only be rotated when the ball head 20 is seated in the correct position in the ball socket 19. This particular embodiment of the connection between the coupling element 17 and the joint piece 18 results in high installation safety, as even an inexperienced assembler can assemble the arrangement only in the correct manner. If, for example, the ball head 20 were not seated correctly in the ball socket 19 of the joint piece 18, a rigid arrangement of the coupling element 17 would result on the first support frame 10, whereby incorrect installation would become apparent. At the same time, the formation of the joint piece 18 allows for a ball-in front of-ball arrangement between the ball heads 15 and 20, whereby particularly few to no deviation errors of light fields relative to each other are generated in the adjustment of the support frame 10 and 11 to each other.

The invention is not limited in its configuration to the above-mentioned, preferred embodiment. Rather, a number of variants are conceivable which make use of the illustrated solution even with fundamentally different types of configurations. All of the features and/or advantages resulting from the claims, the description or the drawings, including design details, spatial arrangements and method steps, may be essential to the invention both by themselves and in various combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A headlight for a motor vehicle comprising:
a first light module received in a first support frame;
at least a second light module received in a second support frame;
a headlight range adjustment device with an adjustment element, which extends between the headlight range adjustment device and the first support frame in an adjustment axis, the adjustment element having a ball head, which is accommodated by a ball head receptacle on the first support frame;
a coupling element with which the first support frame is connected to the second support frame; and
a joint piece with a ball socket that is arranged on the first support frame,
wherein in the ball socket, a ball head of the coupling element is received, and
wherein an arrangement of the joint piece on the first support frame is formed such that the adjustment axis of the adjustment element runs in its extension through the ball head of the coupling element.

2. The headlight according to claim 1, wherein the joint piece is fastened on the first support frame on a side facing away from the headlight range adjustment device, for which purpose the joint piece has a fastening portion.

3. The headlight according to claim 1, wherein the ball socket of the joint piece has a lateral opening through which the ball head of the coupling element is adapted to be inserted into the ball socket when the joint piece is arranged on the first support frame.

4. The headlight according to claim 2, wherein the joint piece is integrally formed with the ball socket and the fastening portion.

5. The headlight according to claim 2, wherein the fastening portion is a fastening dome, into which a screw element is adapted to be inserted.

6. The headlight according to claim 4, wherein the joint piece has a basic structure portion which integrally connects the fastening portion with the ball socket, wherein the fastening portion projects perpendicularly from the basic structure portion, and wherein the lateral opening of the ball socket is located on one end side of the fastening section.

7. The headlight according to claim 1, wherein the ball socket of the joint piece has a bottom-side opening to which or in which the ball head receptacle projects or is seated for receiving the one ball head on the adjustment element.

8. The headlight according to claim 1, wherein the ball head of the coupling element has a planar surface that is adapted to be brought into overlap with a planar bottom portion in the ball socket for inserting the ball head in the ball socket.

9. The headlight according to claim 1, wherein the coupling element extends in a coupling axis, and wherein the coupling axis extends at an angle relative to the adjustment axis.

* * * * *